US005790320A

United States Patent [19]

Han et al.

[11] Patent Number: 5,790,320

[45] Date of Patent: Aug. 4, 1998

[54] CORRECTION LENS SYSTEM OF AN EXPOSURE APPARATUS FOR A CATHODE-RAY TUBE AND A METHOD FOR MANUFACTURING THE SAME

[75] Inventors: Dong-hee Han; Yoon-hyoung Cho, both of Kyungki-do; Jun-sik Oh, Seoul; Ki-su Han, Kyungki-do, all of Rep. of Korea

[73] Assignee: Samsung Display Devices Co., Ltd., Kyungki-do, Rep. of Korea

[21] Appl. No.: 777,710

[22] Filed: Dec. 20, 1996

[30] Foreign Application Priority Data

Dec. 21, 1995 [KR] Rep. of Korea .................. 1995 53516
Dec. 21, 1995 [KR] Rep. of Korea .................. 1995 45151

[51] Int. Cl.[6] .................. G02B 3/08

[52] U.S. Cl. .................. 359/741; 359/708

[58] Field of Search .................. 359/741, 642, 359/708

[56] References Cited

U.S. PATENT DOCUMENTS 5,122,819 6/1992 Sato .................. 359/741

*Primary Examiner*—Scott J. Sugarman
*Attorney, Agent, or Firm*—Christie, Parker & Hale, LLP

[57] ABSTRACT

Disclosed is a correction lens system of an exposure apparatus for a cathode-ray tube which comprises a lens formed with a plurality of block cells joined together and which diffuses and irradiates a light emitted from a light source to an inner surface of a panel, characterized in that the lens system is structured to interrupt ultraviolet rays having a wave length of less than 300 nm, and a method for manufacturing a correction lens of an exposure apparatus for a cathode-ray tube, for diffusing and irradiating a light emitted from a light source to an inner surface of a panel, wherein the method comprises the steps of treating a plurality block cells made of glass such that an upper part of each block cell is inclined at a predetermined angle, polishing the block cells, and adhering the block cells to each other to form a correction lens having a certain shape.

8 Claims, 3 Drawing Sheets

CORRECTION LENS SYSTEM OF AN EXPOSURE APPARATUS FOR A CATHODE-RAY TUBE AND A METHOD FOR MANUFACTURING THE SAME

BACKGROUND

The present invention relates to a correction lens of an exposure apparatus for a cathode-ray tube and a method for manufacturing the same, and more particularly, to a correction lens having an increased life span and a method for manufacturing the same.

Generally, when manufacturing a cathode-ray tube, an exposure apparatus is used for forming both a black matrix and a fluorescent layer on an inner surface of a panel. The panel of the cathode-ray tube is exposed to light by the exposure apparatus in either stripe type or dot type according to a shape of an aperture of a shadow mask.

The exposure apparatus comprises an exposure pedestal on which a panel having a shadow mask is disposed, a body connected to a lower portion of the exposure pedestal, a light source, mounted inside the body, for irradiating a light to an inner surface of the panel, and a correction lens and a filter for refracting or diffusing the light emitted from the light source.

The conventional exposure apparatus forms a black matrix having a certain shape on the inner surface of the panel by exposing photosensitive resin deposited on the inner surface of the panel of the cathode-ray tube or forms a fluorescent surface by exposing fluorescent material deposited on an inner surface of the panel.

Recently, when manufacturing a large-sized industrial cathode-ray tube, the exposure apparatus further comprises another correction lens 12; namely, a segmented correction lens, used during an exposure process, to reduce a rotating landing error rate of an electron beam as shown in FIG. 5.

The segmented correction lens 12 has a discontinuous surface while the common correction lens 10 has a continuous surface. The discontinuous surface allows the segmented correction lens 12 to be used for the exposure apparatus either independently as the common correction lens 10 or together with the common correction lens 10.

Generally, the conventional segmented correction lens 12 is made of PMMA (poly methl methacrylate) by injection molding or pressing and it is shaped as if a plurality of block cells are joined together.

Since the segmented correction lens 12 has a discontinuous surface, during the exposure process, it allows the light, emitted from the light source and passing through the common lens, to be more diffused to the inner surface of the panel P, thereby enhancing exposure effect.

However, after about 20-days of use (40 hours when independently used), the conventional segmented correction lens described above turns yellow resulting in deteriorating transmittivity, thereby requiring frequent change of the segmented correction lens. Further, using the exposure apparatus employing such a segmented correction lens disallows the obtainment of an enhanced exposure effect, thereby deteriorating quality of the cathode-ray tube.

After long research, it has been proved that the change of color, i.e., yellowing of the segmented correction lens, is caused by breaking links of C-H and C=O composing PMMA, the material for the segmented correction lens. These breaking links are, in turn, caused by extreme ultraviolet rays, having a wave length of less than 300 nm, emitted from the light source and passing through the segmented correction lens.

SUMMARY OF THE INVENTION

The present invention has been made in an effort to solve the above problems and its objective is to provide a correction lens of an exposure apparatus for a cathode-ray tube and a method for manufacturing the same which can increase the life span of the correction lens by preventing the yellowing of the correction lens due to ultraviolet rays emitted from the light source in an exposure process.

To achieve the above objective, the present invention provides a correction lens system of an exposure apparatus for a cathode-ray tube which comprises a lens formed with a plurality of block cells joined together and which diffuses and irradiates a light emitted from a light source to an inner surface of a panel, characterized in that the lens system is structured to interrupt ultraviolet rays having a wave length of less than 300 nm.

For interrupting ultraviolet rays having a wave length of less than 300 nm, the correction lens system further comprises an interrupting member attached on its one side opposing the light source.

It is desirable that the interrupting member is made of a glass substrate or an optical filter element, and uses an optical filter element resulting in increasing the life of the correction lens.

According to another aspect of the present invention, the correction lens of the exposure apparatus for the cathode-ray tube is formed by adhering a plurality of block cells made of glass, particles of which are not broken by ultraviolet rays having a wave length of less than 300 nm.

Further, according to another aspect of the present invention, a method for manufacturing a correction lens of an exposure apparatus for a cathode-ray tube, for diffusing and irradiating a light emitted from a light source to an inner surface of a panel, comprises the steps of:

- treating a plurality block cells made of glass such that an upper part of each block cell is inclined at a predetermined angle;
- polishing the block cells; and
- adhering the block cells to each other to form a correction lens having a certain shape.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE INVENTION

Reference will now be made in detail to the presently preferred embodiment of the invention, an example of which is illustrated in the accompanying drawings. Wherever possible, the same reference numbers will be used throughout the drawings to: refer to the same or like parts.

Figure 1:
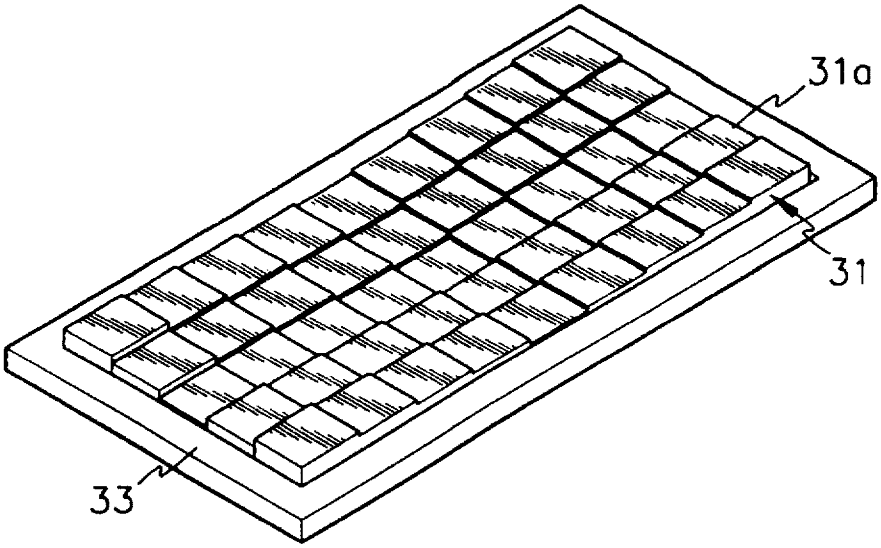
FIG. 1 is a perspective view illustrating a correction lens system according to a first embodiment of the present invention.

FIG. 1 is a perspective view illustrating a correction lens system according to a first embodiment of the present invention.

As described above, the correction lens system comprises a segmented correction lens 31 formed with block cells 31*a* joined together by injection molding or pressing, wherein the segmented correction lens 31 is formed of PMMA.

As a feature of the present invention, the correction lens system further comprises an interrupting member 33 having a predetermined thickness and attached on a surface of the lens 31 which faces a light source.

It is desirable that the interrupting member 33 is made of material which can interrupt ultraviolet rays having a wave length less than 300 nm, namely, extreme ultraviolet rays emitted from a light source of an exposure apparatus for a cathode-ray tube. As an example of the material, a glass substrate or an optical filter element may be used.

Figure 2:
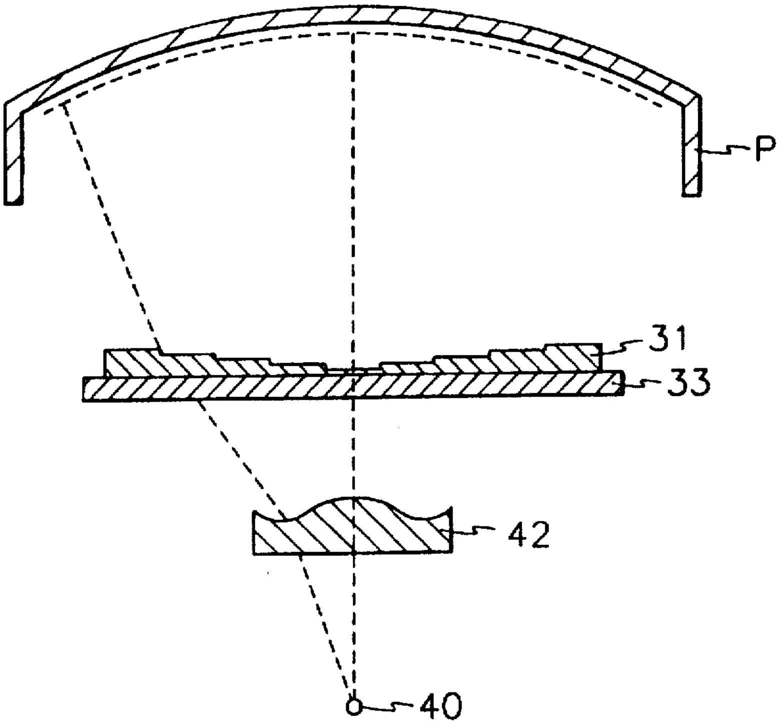
FIG. 2 is a schematic diagram illustrating a structure of an exposure apparatus for a cathode-ray tube employing a correction lens system according to the present invention.

As shown in FIG. 2, during an exposure process, the segmented correction lens 31 having the interrupting member 33 allows an inner surface of a panel P to be exposed to ultraviolet rays diffused and emitted from a light source 40 through a common correction lens 42.

At this point, the inventive segmented correction lens 31 allows only the ultraviolet rays having a wave length more than 300 nm to pass therethrough.

That is, when the ultraviolet rays emitted from the light source 40 pass through the segmented correction lens 31, the ultraviolet rays having a wave length of less than 300 nm are interrupted by the interrupting member 33.

Accordingly, breaking links of C-H and C=O composing PMMA, material for the segmented correction lens, caused by ultraviolet rays having a wave length of less than 300 nm is prevented, and, therefore, yellowing as in the conventional segmented correction lens is avoided.

Figure 3:
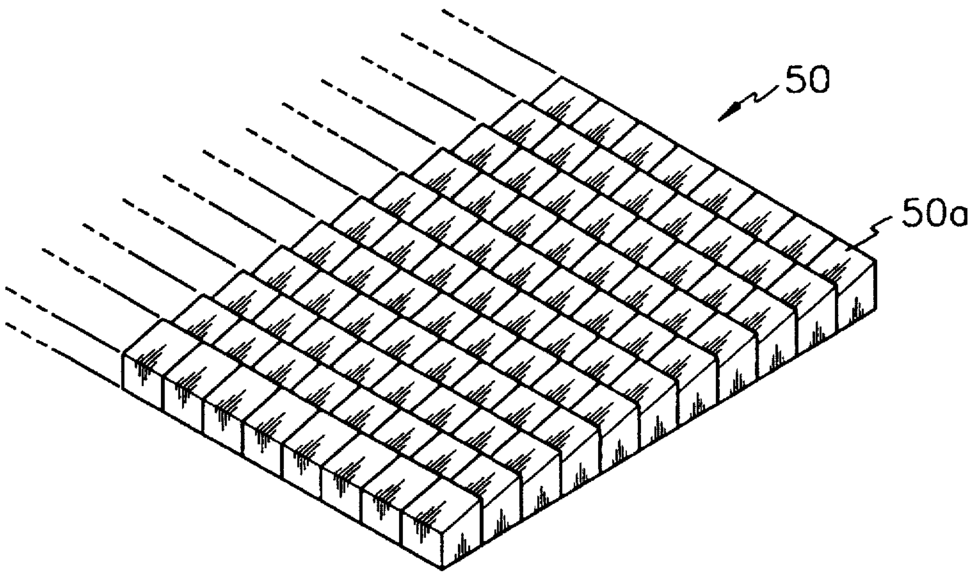
FIG. 3 is a partial perspective view illustrating a correction lens system according to a second embodiment of the present invention.
Figure 4:
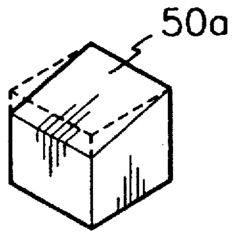
FIG. 4 is a perspective view illustrating a block cell of a correction lens system shown in FIG. 3.
Figure 5:
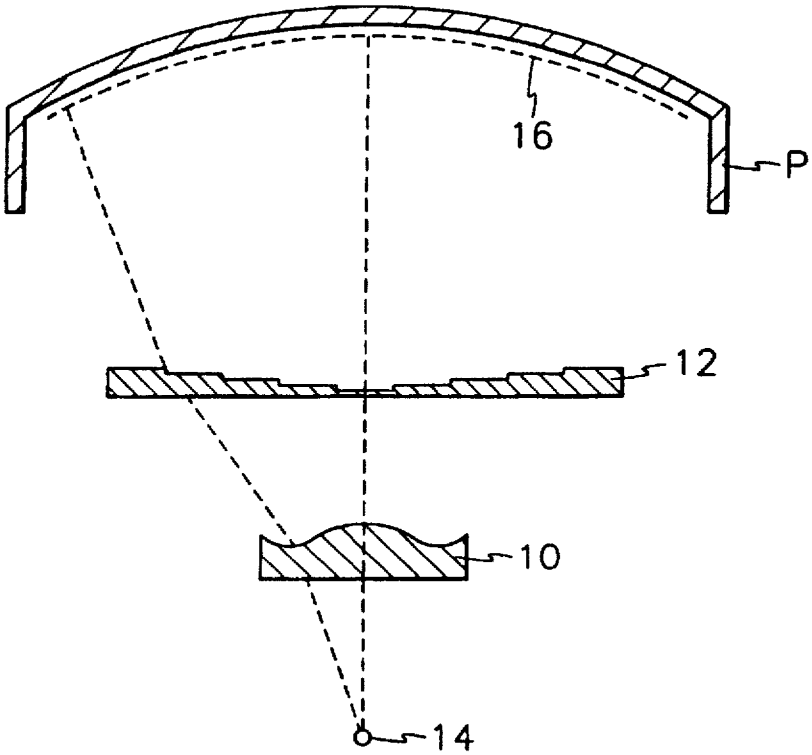
FIG. 5 (PRIOR ART)
FIG. 5 is a schematic diagram illustrating a structure of a conventional exposure apparatus.

FIG. 3 is a partial perspective view illustrating a correction lens manufactured by a method according to the present invention, wherein the correction lens is a block-type correction lens.

The segmented correction lens 50 is formed by joining a plurality of block cells 50*a* as in the conventional segmented correction lens.

However, while the conventional segmented correction lens is formed by injection molding or pressing, the segmented correction lens 50 is formed by adhering a plurality of block cells 50*a* to each other.

To form the segmented correction lens 50, it is necessary to prepare a plurality of block cells 50*a* each having a predetermined size.

Preferably, each block cell 50*a* is made of glass while the conventional block cell is made of PMMA.

In the next step, each block cell 50*a* is treated such that one side of an upper part (represented by a dotted line in FIG. 3) thereof is inclined at a predetermined angle.

The angle of the upper part of the block cell 50 is determined according to the property of the cathode-ray tube to be exposed.

In the next step, each block cell 50*a* is polished and adhered to each other in a predetermined pattern to form a segmented correction lens 50. Adherence of the block cells 50*a* is carried out using a common method for each adhering operation.

Using the above-described segmented correction lens 50 in the exposure process, though the ultraviolet rays pass through the segmented correction lens 50, disallows the change of color caused by breaking components of the material since the segmented correction lens 50 is made of glass.

The following are the efficacious results obtained by using the present invention.

The correction lens of the exposure apparatus for the cathode-ray tube comprises the interrupting member, attached on its bottom portion, for interrupting the ultraviolet rays which causes yellowing in the correction lens made of acryl.

Further, since the segmented correction lens according to another aspect of the present invention is formed by adhering a plurality of block cells made of glass, the segmented correction lens is not affected by the ultraviolet rays which break some components of material of the conventional segmented correction lens.

To this end, it is possible to prevent deterioration of transmittivity of the correction lens caused by yellowing, thereby increasing the life of the correction lens.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A correction lens system of an exposure apparatus for an inner surface of a cathode-ray tube panel comprising:

a lens having a plurality of block cells joined together for diffusing and irradiating light emitted from a light source to the inner surface of the cathode-ray tube panel, and an interrupting element for interrupting light having a wavelength of less than 300 nm from the light source to the lens.

2. The correction lens system of claim 1 wherein the interrupting member is attached to the lens.

3. The correction lens system of claim 2 wherein said interrupting member comprises a glass substrate.

4. The correction lens system of claim 2 wherein said interrupting member comprises an optical filter element.

5. A method for manufacturing a correction lens, of an exposure apparatus for a cathode-ray tube, for diffusing and irradiating light emitted from a light source to an inner surface of a panel of the cathode-ray tube, comprising the steps of:

treating a plurality of glass block cells such that an upper part of each of the block cells is inclined at a predetermined angle;

polishing each of said block cells; and adhering each of said block cells to each other to form a correction lens having a certain shape.

6. A correction lens system of an exposure apparatus for a cathode-ray tube, said cathode-ray tube having a panel with an inner surface, the correction lens system comprising a lens having a plurality of block cells joined together for diffusing and irradiating light emitted from a light source to the inner surface of the cathode-ray tube panel, said lens interrupting light having a wavelength of less than 300 nm from the light source to the cathode-ray tube panel.

7. The correction lens system of claim 6 wherein said lens comprises of glass.

8. An exposure apparatus for an inner surface of a cathode-ray tube panel comprising a correction lens system having a lens with a plurality of block cells joined together for diffusing and irradiating light emitted from a light source to the inner surface of the cathode-ray panel, said correction lens system interrupting light having a wavelength of less than 300 nm from the light source to the cathode-ray tube panel.

* * * * *